United States Patent
Jeon et al.

(10) Patent No.: US 11,670,256 B2
(45) Date of Patent: Jun. 6, 2023

(54) COLOR GAMUT MAPPING DEVICE, TUNING METHOD THEREOF, AND IMAGE PROCESSOR

(71) Applicant: LX SEMICON CO., LTD., Daejeon (KR)

(72) Inventors: Hyun Kyu Jeon, Daejeon (KR); Ji Won Lee, Daejeon (KR); Ji Hong Yuk, Daejeon (KR); Chang Young Bae, Daejeon (KR); Seul Gi Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 20 days.

(21) Appl. No.: 17/528,368

(22) Filed: Nov. 17, 2021

(65) Prior Publication Data
US 2022/0165232 A1    May 26, 2022

(30) Foreign Application Priority Data
Nov. 20, 2020   (KR) .......................... 10-2020-0156258

(51) Int. Cl.
*G09G 5/02* (2006.01)
*H04N 1/60* (2006.01)
(Continued)

(52) U.S. Cl.
CPC ............. *G09G 5/02* (2013.01); *H04N 1/6066* (2013.01); *H04N 9/67* (2013.01);
(Continued)

(58) Field of Classification Search
CPC ............. G09G 5/02; G09G 2320/0666; G09G 2320/0626; G09G 2320/0673;
(Continued)

(56) References Cited

U.S. PATENT DOCUMENTS 10,078,998 B2    9/2018  Chu et al.
2002/0163669 A1*  11/2002  Yamazaki ............ H04N 1/6058
                                                358/1.9
(Continued)

FOREIGN PATENT DOCUMENTS

KR    10-2113178 B1    5/2020
KR    10-2207464 B1    1/2021

*Primary Examiner* — Wesner Sajous
(74) *Attorney, Agent, or Firm* — Harness, Dickey & Pierce, P.L.C.

(57) ABSTRACT

The disclosure relates to a color gamut mapping device that allows a gamma characteristic for each color to be tuned to match a target gamma curve through color gamut mapping, a tuning method thereof, and an image processor including the same. The color gamut mapping device controls a hue and saturation of an image signal to match a target color gamut using a hue parameter assigned to each of a plurality of hue axes and a saturation parameter assigned to correspond to each of a plurality of saturation control areas of each hue axis, and the color gamut mapping device changes the saturation of the image signal by changing the saturation parameter which is assigned to each hue axis and corresponds to the uppermost saturation control area so that a gamma characteristic for each color of the image signal is changed to match a target gamma curve for each color.

20 Claims, 7 Drawing Sheets

(51) Int. Cl.
*H04N 5/202* (2023.01)
*H04N 5/57* (2006.01)
*H04N 9/67* (2023.01)
*H04N 9/69* (2023.01)
*H04N 9/77* (2006.01)

(52) U.S. Cl.
CPC ............ *G09G 2320/0626* (2013.01); *G09G 2320/0666* (2013.01); *G09G 2320/0673* (2013.01)

(58) Field of Classification Search
CPC ....... G09G 2360/16; G09G 2320/0242; G09G 2360/144; G09G 2360/127; G09G 2340/06; G09G 2320/0276; G09G 2320/04; G09G 2320/043; G09G 2320/06; G09G 2320/066; G09G 2320/0693; G09G 2320/02; G09G 2320/0233; G06T 11/001; H04N 1/60; H04N 1/56; H04N 1/6033; H04N 1/6027; H04N 1/6052; H04N 1/6075; H04N 1/6077; H04N 1/608; H04N 9/64; H04N 5/57; H04N 5/58; H04N 9/3182; H04N 9/68; H04N 9/69; H04N 9/73; H04N 9/74; H04N 9/77; H04N 5/20; H04N 5/202

See application file for complete search history.

(56) References Cited

U.S. PATENT DOCUMENTS

| | | | | |
|---|---|---|---|---|
| 2005/0280848 | A1* | 12/2005 | Seko | H04N 1/6058 358/1.9 |
| 2006/0244983 | A1* | 11/2006 | Zeng | H04N 1/6058 358/1.9 |
| 2006/0274340 | A1* | 12/2006 | Yamazoe | H04N 1/6058 358/1.9 |
| 2010/0020106 | A1* | 1/2010 | Gil | G09G 5/02 345/690 |
| 2013/0271779 | A1* | 10/2013 | Suzuki | H04N 1/6058 358/1.9 |
| 2013/0335439 | A1* | 12/2013 | Jeong | G09G 5/06 345/590 |
| 2014/0126004 | A1* | 5/2014 | Miyahara | H04N 1/6061 358/1.9 |
| 2015/0242724 | A1* | 8/2015 | Nishizaki | H04N 1/605 358/3.21 |
| 2022/0165232 | A1* | 5/2022 | Jeon | H04N 1/6066 |

* cited by examiner

COLOR GAMUT MAPPING DEVICE, TUNING METHOD THEREOF, AND IMAGE PROCESSOR

CROSS-REFERENCE TO RELATED APPLICATIONS

This application claims the benefit of the Korean Patent Application No. 10-2020-0156258 filed on Nov. 20, 2020, which are hereby incorporated by reference as if fully set forth herein.

FIELD OF THE INVENTION

The present disclosure relates to a color gamut mapping device that allows a gamma characteristic for each color to be tuned to match a target gamma curve through color gamut mapping, a tuning method thereof, and an image processor.

BACKGROUND

As display devices are being developed toward higher resolution and higher definition, color reproducibility thereof is improving.

Since a color reproduction area that can be expressed by a display device, that is, a color gamut, varies depending on the characteristics of the display device, a color gamut mapping process for compressing or extending a color gamut of an input image according to the characteristics of the display device is required.

In order to improve color reproducibility of the display device, a gamma tuning process in which gamma characteristics different for each color of red, green, and blue are tuned to match a target gamma curve for each color according to characteristics of the display device is also required.

SUMMARY

The present disclosure is directed to providing a color gamut mapping device that allows a gamma characteristic for each color to be tuned to match a target gamma curve through color gamut mapping, a tuning method thereof, and an image processor.

One aspect of the present disclosure provides a tuning method of a color gamut mapping device, which includes, in each of a plurality of control areas divided by a plurality of hue axes having different hue angles, setting, by a test device, an uppermost saturation control point, which determines an uppermost saturation control area, among a plurality of saturation control points of the color gamut mapping device divided into a plurality of saturation control areas according to a saturation value to a maximum saturation value or setting the uppermost saturation control point to a saturation value close to the maximum saturation value, changing, by the test device, hue parameters of the color gamut mapping device assigned to each of the plurality of hue axes and saturation parameters of the color gamut mapping device assigned to correspond to each of the plurality of saturation control areas of each hue axis and tuning a color gamut of the color gamut mapping device to match a target color gamut, and tuning a gamma curve for each color to match a target gamma curve for each color by changing the saturation parameter of the color gamut mapping device corresponding to the uppermost saturation control area according to a result of comparing the measured gamma curve for each color with the target gamma curve for each color.

The tuning of the color gamut may include changing, by the test device, the saturation parameters of the remaining saturation control areas except for the uppermost saturation control area among the saturation parameters of the color gamut mapping device.

The tuning of the gamma curve may include, as the result of the comparison, until the measured gamma curve for each color falls within a range of the target gamma curve for each color, repeating, by the test device, an operation, in which the saturation parameter of the uppermost saturation control area of the color gamut mapping device is changed, the gamma curve of each color image output to the display device through the color gamut mapping device is measured, and the measured gamma curve for each color is compared with the target gamma curve for each color.

Another aspect of the present disclosure provides a color gamut mapping device configured to, in each of a plurality of control areas divided by a plurality of hue axes having different hue angles, set an uppermost saturation control point, which determines an uppermost saturation control area, among a plurality of saturation control points divided into a plurality of saturation control areas according to a saturation value to a maximum saturation value or set the uppermost saturation control point to a saturation value close to the maximum saturation value. The color gamut mapping device may control a hue and saturation of an image signal to match a target color gamut using a hue parameter assigned to each of the plurality of hue axes and a saturation parameter assigned to correspond to each of the plurality of saturation control areas of each hue axis, and change the saturation of the image signal by changing the saturation parameter which is assigned to each hue axis and corresponds to the uppermost saturation control area so that a gamma characteristic for each color of the image signal is changed to match a target gamma curve for each color.

Still another aspect of the present disclosure provides an image processor including a color gamut mapping device for controlling and outputting a hue and saturation of an image signal to match a target color gamut using hue parameters assigned to each of a plurality of hue axes that determine a plurality of control areas and saturation parameters to correspond to each of a plurality of saturation control areas obtained by dividing each of the plurality of control areas, wherein the color gamut mapping device sets an uppermost saturation control point, which determines an uppermost saturation control area, among a plurality of saturation control points divided into the plurality of saturation control areas as a maximum saturation value or sets the uppermost saturation control point as a saturation value close to the maximum saturation value, and the color gamut mapping device changes the saturation of the image signal by changing the saturation parameter which is assigned to each hue axis and corresponds to the uppermost saturation control area so that a gamma characteristic for each color of the image signal is changed to match the target gamma curve for each color.

When the saturation parameter corresponding to the uppermost saturation control area is increased, a brightness of a pixel whose saturation is controlled through the uppermost saturation control area may be increased, a brightness of a pixel whose saturation is controlled through the remaining saturation control areas may be relatively reduced, and thus a gamma value of the gamma characteristic for each color may be increased.

When the saturation parameter corresponding to the uppermost saturation control area is reduced, a brightness of a pixel whose saturation is controlled through the uppermost saturation control area may be reduced, a brightness of a pixel whose saturation is controlled through the remaining saturation control areas may be relatively increased, and thus a gamma value of the gamma characteristic for each color may be reduced.

The color gamut mapping device may include a color space converter configured to convert first three-color signals of the image signal into a first luminance component and a pair of first chrominance components and output the first luminance component and the pair of first chrominance components, a hue calculator configured to calculate and output a hue angle using the first chrominance components, a hue axis selection part configured to select and output hue axes of a corresponding control area in which the calculated hue angle is located among a plurality of control areas, a parameter calculator configured to further divide each control area into a plurality of hue control areas by a saturation value of a hue control point, and calculate and output hue gains and saturation gains which are to be applied to the first chrominance components using the saturation parameters assigned to the selected hue axes for each of the plurality of saturation control areas, the hue parameters assigned to each of the plurality of hue control areas, and the calculated hue angle, a saturation controller configured to control a saturation of the first chrominance component using the calculated saturation gains and output a second chrominance component, a hue controller configured to control a saturation of the second chrominance component using the calculated hue gains and output a third chrominance component, and a color space inverse converter configured to inversely convert the output chrominance components for which the control of the hue and saturation is completed and the first luminance component into second three-color signals and output the second three-color signals.

The color gamut mapping device may further include an overall controller configured to entirely control a saturation and hue of the third chrominance component output from the hue calculator using overall saturation gains and overall hue gains and output a fourth chrominance component to the color space inverse converter.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
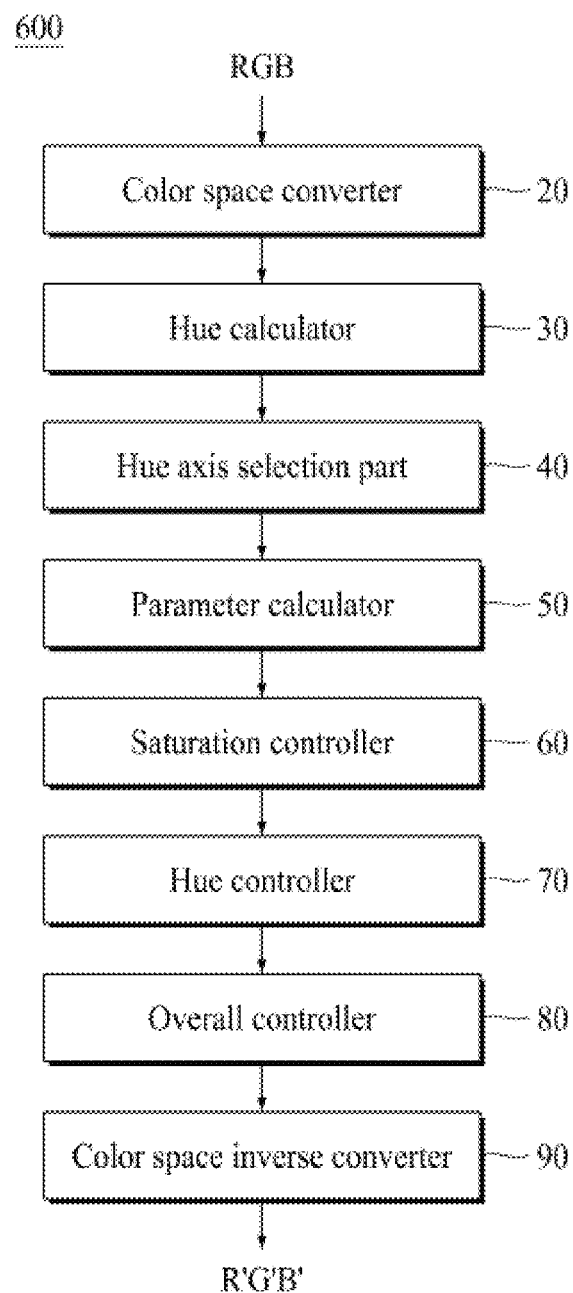
FIG. 1 is a block diagram illustrating a color gamut mapping device capable of performing gamma tuning according to an embodiment.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

As used herein, the term "part" refers to software or a hardware component such as a field-programmable gate array (FPGA) or an application-specific integrated circuit (ASIC), and the "part" performs certain functions. However, the "part" is not limited to software or hardware. The "part" may be configured to be stored in a storage medium that may be addressed or may be configured to be executed by one or more processors. Therefore, the "part" includes, for example, software components, processes, functions, drivers, firmware, circuits, data, database, and tables.

Hereinafter, exemplary embodiments of the present disclosure will be described in detail with reference to the accompanying drawings.

FIG. 1 is a block diagram illustrating a color gamut mapping device capable of performing gamma tuning according to an embodiment of the present disclosure.

The color gamut mapping device according to the embodiment may control a saturation and hue angle of an image to output an image mapped to a target color gamut, and may control a saturation of an image by changing a saturation gain of an uppermost saturation control area to output the image in which a gamma characteristic for each color are corrected to match a target gamma curve for each color.

A color gamut mapping device 600 illustrated in FIG. 1 may include a color space converter 20, a hue calculator 30, a hue axis selection part 40, a parameter calculator 50, a saturation controller 60, a hue controller 70, an overall controller 80, an a color space inverse converter 90. In FIG. 1, the overall controller 80 may be omitted.

As input image signals, RGB-type image signals (hereinafter, red (R), green (G), and blue (B) signals) respectively representing red, green, and blue image signals may be used.

The color space converter 20 may receive input R, G, and B signals and convert the R, G, and B signals into YCbCr type image signals (hereinafter, Y, Cb, and Cr signals) including a luminance component Y, a chrominance component Cb, and a chrominance component Cr.

For example, the color space converter 20 may convert the R, G, and B signals into the Y, Cb, and Cr signals by using an RGB-to-YCbCr conversion function in which transform coefficients (in International Telecommunication Union (ITU)-R Recommendation BT.2020) are applied as shown in Equation 1 below. The transform coefficients applied to Equation 1 below may be changed.

$$Y = 0.2627 \times R + 0.678 \times G + 0.0593 \times B$$

$$Cb = -0.1396 \times R - 0.3603 \times G + 0.5 \times B$$

$$Cr = 0.5 \times R - 0.459 \times G - 0.0402 \times B \quad \text{[Equation 1]}$$

In other words, the color space converter 20 may divide the R, G, and B signals into a luminance signal Y representing luminance information and chrominance signals Cb and Cr representing color information. The color space converter 20 may output the Y, Cb, and Cr signals to the hue calculator 30.

The hue calculator 30 may calculate a hue angle representing a hue value using the chrominance signals Cb and Cr among the image signals Y, Cb, and Cr supplied from the color space converter 20.

Figure 2:
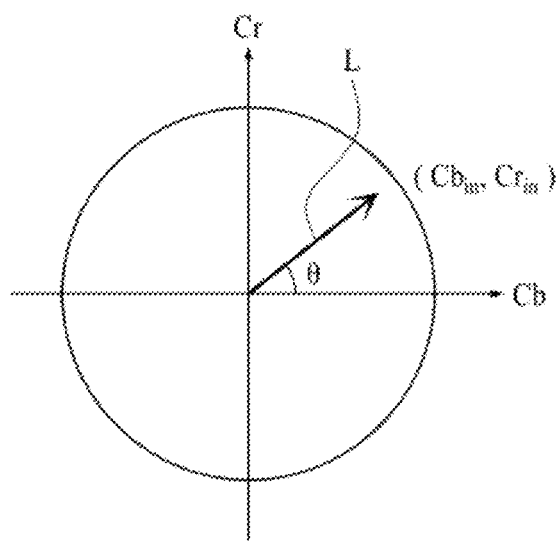
FIG. 2 is a diagram illustrating an example of a hue angle of chrominance components (Cb, Cr) according to an embodiment.

Referring to FIG. 2, a hue angle θ with respect to input Cb and Cr coordinates ($Cb_{in}$, $Cr_{in}$) on a Cb-Cr plane refers to an angle between a Cb axis and a straight line L connecting the corresponding Cb and Cr coordinates ($Cb_{in}$, $Cr_{in}$) from the origin. The hue calculator 30 may calculate the hue angle θ with respect to the input Cb and Cr coordinates ($Cb_{in}$, $Cr_{in}$) using an arc tangent function (atan) of the Cb and Cr coordinates ($Cb_{in}$, $Cr_{in}$) as shown in Equation 2 below.

$$\text{Hue}(=\theta) = \text{atan}(Cb\text{in}, Cr\text{in}) \quad \text{[Equation 2]}$$

The hue calculator 30 may output the image signals Y, Cb, and Cr supplied from the color space converter 20 and the calculated hue angle to the hue axis selection part 40.

The hue axis selection part 40 may select hue axes of an area in which the hue angle is located using the hue angle supplied from the hue calculator 30.

Figure 3:
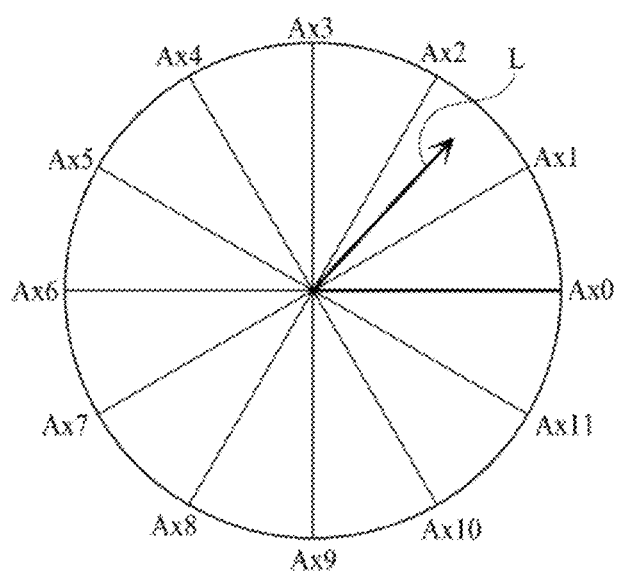
FIG. 3 is a diagram illustrating hue axes in a circular color area according to an embodiment.

For example, twelve hue axes Ax0 to Ax11 having intervals of 30 degrees may be assigned in a circular color area on the Cb-Cr plane shown in FIG. 3, and the circular color area may be divided into twelve areas by the twelve hue axes Ax0 to Ax11.

The hue axis selection part 40 may select a first hue axis and a second hue axis in an area in which the supplied hue angle is located among the twelve hue axes Ax0 to Ax11. The second hue axis may have a greater hue angle than the first hue axis.

For example, as shown in FIG. 3, when a hue angle θ calculated by the hue calculator 30, that is, a straight line L of the input Cb, Cr coordinates, is located in an area between the hue axis Ax1 and the hue axis Ax2, the hue axis selection part 40 may select the first hue axis Ax1 and the second hue axis Ax2 in the corresponding area.

The hue axis selection part 40 may output the image signals Y, Cb, and Cr and the hue angle, which are supplied from the hue calculator 30, and two hue axes, which are selected to correspond to the hue angle, to the parameter calculator 50.

The parameter calculator 50 may calculate a plurality of parameters using the two hue axes and the hue angle supplied from the hue axis selection part 40. The parameter calculator 50 may calculate a plurality of parameters using the parameters that are set to correspond to the two hue axes supplied from the hue axis selection part 40 and using the supplied hue angle.

The parameters calculated by the parameter calculator 50 may include saturation gains for saturation control and hue gains for hue control.

The circular color area on the Cb-Cr plane may be divided into a plurality of control areas by a plurality of hue axes according to the hue angle, and the hue and the saturation may be independently adjusted in each control area using the parameters individually assigned to each of the plurality of hue axes.

Further, each of the control areas divided by the hue axes may be further divided into a plurality of saturation control areas to which different saturation gains are applied in order to control the saturation precisely according to a saturation value. In particular, it is possible to adjust a gamma curve for each of the R, G, and B by adjusting the saturation gain corresponding to the uppermost saturation control area among the plurality of saturation control areas.

Furthermore, each of the control areas divided by the hue axes may be further divided into a plurality of hue control areas to which different color gains are applied according to the saturation value in order to control the hue precisely according to the saturation value.

Figure 4:
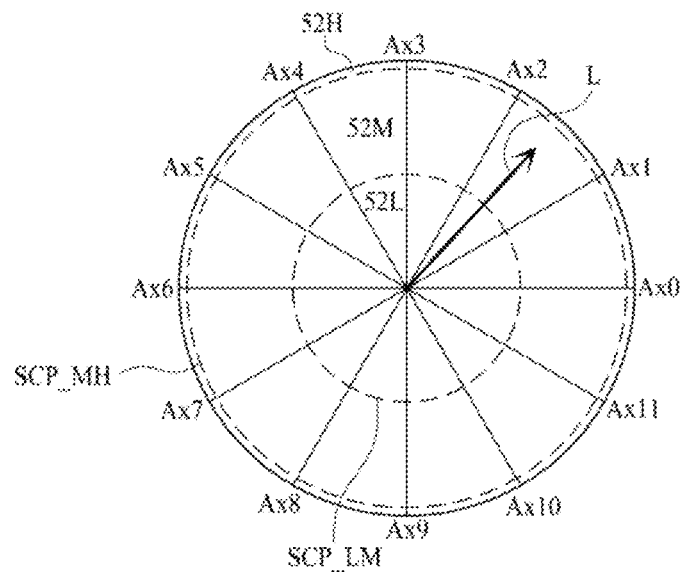
FIG. 4 is a diagram illustrating saturation control areas in a circular color area according to an embodiment.
Figure 5:
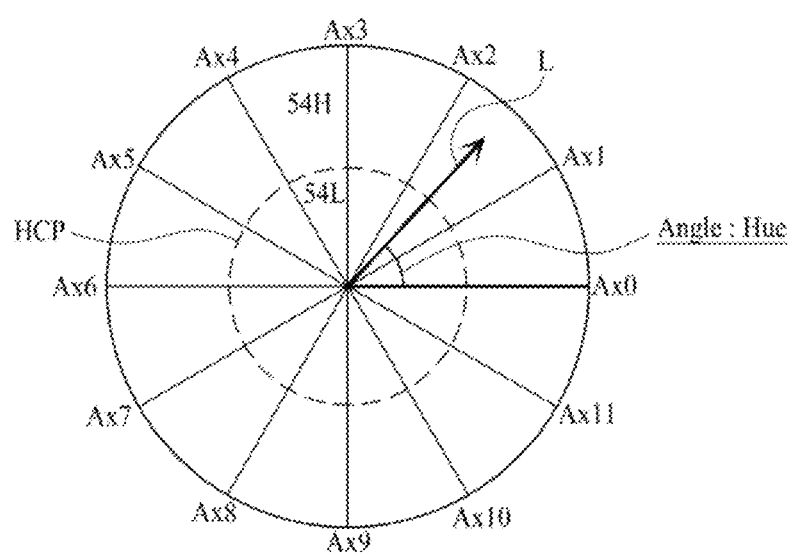
FIG. 5 is a diagram illustrating hue control areas in a circular color area according to an embodiment.

For example, as illustrated in FIGS. 4 and 5, the circular color area on the Cb-Cr plane may be divided into twelve control areas by twelve hue axes Ax0 to Ax11 according to a hue angle. As shown in FIG. 4, each of the control areas divided by the hue axes Ax0 to Ax11 may be divided into first to third saturation control areas 52L, 52M, and 52H according to the saturation value corresponding to a length of a straight line L from the origin. Further, as shown in FIG. 5, each of the control areas divided by the hue axes Ax0 to Ax11 may be further divided into first and second hue control areas 54L and 54H according to the saturation value.

In a register used by the parameter calculator 50, a first saturation control point SCP_LM, a second saturation control point SCP_MH, and a hue control point HCP may be set and stored. The first saturation control point SCP_LM, the second saturation control point SCP_MH, and the hue control point HCP may be adjusted according to display characteristics.

The first saturation control point SCP_LM refers to a first saturation boundary value that distinguishes the first saturation control area 52L corresponding to a lower saturation area from the second saturation control area 52M corresponding to an upper saturation area. The second saturation control point SCP_MH refers to a second saturation boundary value that distinguishes the second saturation control area 52M from the third saturation control area 52H corresponding to an uppermost saturation control area. In particular, in FIG. 4, the second saturation control point SCP_MH may be set to a saturation value close to a maximum saturation value of each hue axis or may be set to a maximum saturation value. For example, the second saturation control point SCP_MH may be set to a maximum saturation value of each hue axis.

The hue control point HCP refers to a saturation boundary value that distinguishes the first hue control area 54L corresponding to a lower saturation control area for hue control from the second hue control area 54H corresponding to an upper saturation control area for hue control.

The parameters, which are each set and stored in registers of each color axis may include a first saturation parameter corresponding to the first saturation control area 52L, a second saturation parameter corresponding to the second saturation control area 52M, a third saturation parameter corresponding to the third saturation control area 52H, a first hue parameter corresponding to the first hue control area 54L, and a second hue parameter corresponding to the second hue control area 54H. Here, the color gamut mapping device may tune the gamma curve for each color by changing the third saturation parameter corresponding to the third saturation control area 52H of each hue axis, that is, the saturation gain corresponding to the uppermost saturation control area 52H of each hue axis.

Figure 6:
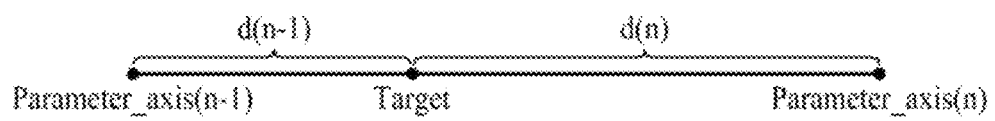
FIG. 6 is a diagram for describing a method of calculating parameters performed by a parameter calculator according to an embodiment.

Referring to FIG. 6, the parameter calculator 50 may linearly interpolate a parameter (gain) Parameter_axis(n−1) of a first hue axis Ax(n−1) (n is a positive integer) and a parameter Parameter_axis(n) of a second hue axis Ax(n) using angle differences d(n−1) and d(n) between a supplied hue angle Target and a corresponding hue axis as shown in Equation 3 below to calculate a linearly interpolated parameter Parameter_result for controlling the saturation or hue of the supplied Cb and Cr signals as a gain.

$$\text{Parameter\_result}=d(n-1)\times\text{Parameter\_axis}(n)+d(n)\times\text{Parameter\_axis}(n-1) \quad \text{[Equation 3]}$$

In Equation 3 above, Parameter_axis(n−1) denotes the parameter set to the first hue axis Ax(n−1) and Parameter_axis(n) denotes the parameter set to the second hue axis Ax(n). d(n−1) denotes the angle difference between the supplied hue angle Target and the first hue axis Ax(n−1) and d(n) denotes the angle difference between the second hue axis Ax(n) and the supplied hue angle Target. The parameters (gains) of each hue axis may include saturation parameters (gains) and hue parameters (gains).

For example, the parameter calculator 50 may linearly interpolate a first saturation parameter set to the first hue axis Ax(n−1) and a first saturation parameter set to the second hue axis Ax(n) as shown in Equation 3 above to calculate a first saturation gain to be applied to the Cb and Cr signals. The parameter calculator 50 may linearly interpolate a second saturation parameter set to the first hue axis Ax(n−1) and a second saturation parameter set to the second hue axis Ax(n) as shown in Equation 3 above to calculate a second saturation gain to be applied to the Cb and Cr signals. The parameter calculator 50 may linearly interpolate a third saturation parameter set to the first hue axis Ax(n−1) and a third saturation parameter set to the second hue axis Ax(n) as shown in Equation 3 above to calculate a third saturation gain to be applied to the Cb and Cr signals.

The parameter calculator 50 may linearly interpolate a first hue parameter set to the first hue axis Ax(n−1) and a first hue parameter set to the second hue axis Ax(n) as shown in Equation 3 above to calculate a first hue gain to be applied to the Cb and Cr signals. The parameter calculator 50 may linearly interpolate a second hue parameter set to the first hue axis Ax(n−1) and a second hue parameter set to the second hue axis Ax(n) as shown in Equation 3 above to calculate a second hue gain to be applied to the Cb and Cr signals.

The parameter calculator 50 may output the image signals Y, Cb, and Cr and the hue angle, which are supplied from the hue axis selection part 40, and the first to third saturation gains and the first and second hue gains, which are calculated by the parameter calculator 50, to the saturation controller 60.

The saturation controller 60 may control the saturation of the chrominance signals Cb and Cr supplied from the parameter calculator 50 using at least one of the first to third saturation gains calculated by the parameter calculator 50. The saturation controller 60 may determine a saturation control area, in which the supplied chrominance signals Cb and Cr are located, and apply the corresponding saturation gain for each saturation control area according to the determined saturation control area to control the saturation of the supplied chrominance signals Cb and Cr.

The saturation controller 60 calculates a saturation value Sat of the supplied chrominance signals Cb and Cr, that is, a saturation value Sat corresponding to a length of a straight line to the coordinates of the chrominance signals Cb and Cr from the origin, as shown in Equation 4 below.

$$Sat = \sqrt{Cb^2 + Cr^2}$$ [Equation 4]

The saturation controller 60 may determine which area the saturation of the chrominance signals Cb and Cr is included in among the first to third saturation control areas by comparing the saturation value of the chrominance signals Cb and Cr with the first and second saturation control points SCP_LM and SCP_MH and may adjust the saturation of the supplied chrominance signals Cb and Cr by applying the corresponding saturation gain among the first to third saturation gains to the determined saturation control area.

The saturation controller 60 may control the saturation of the supplied chrominance signals Cb and Cr by respectively applying different first to third saturation gains to the first to third saturation control areas 52L, 52M, and 52H (see FIG. 4) divided by the first and second saturation control points SCP_LM and SCP_MH.

When the saturation value of the supplied chrominance signals Cb and Cr is smaller than the first saturation control point SCP_LM, the saturation controller 60 may determine that the chrominance signals Cb and Cr are located in the first saturation control area 52L (see FIG. 4) and may control the saturation of the supplied chrominance signals Cb and Cr by applying (multiplying) the first saturation gain of the first saturation control area 52L to (and) the supplied chrominance signals Cb and Cr.

When the saturation value of the supplied chrominance signals Cb and Cr is greater than or equal to the first saturation control point SCP_LM and smaller than the second saturation control point SCP_MH, the saturation controller 60 may determine that the chrominance signals Cb and Cr are located in the second saturation control area 52M (see FIG. 4) and may control the saturation of the supplied chrominance signals Cb and Cr by summing a value obtained by applying (multiplying) the first saturation gain of the first saturation control area 52L to (and) the supplied chrominance signals Cb and Cr for each saturation control area and a value obtained by applying (multiplying) the second saturation gain of the second saturation control area 52M to (and) the supplied chrominance signals Cb and Cr for each saturation control area.

For example, the saturation controller 60 may divide the saturation value Sat of the chrominance signals Cb and Cr located in the second saturation control area 52M (see FIG. 4) into a first saturation value SCP_LM of the first saturation control area 52L corresponding to the first saturation control point SCP_LM and a second saturation value (Sat-SCP_LM) of the second saturation control area 52M obtained by subtracting the first saturation control point SCP_LM from the saturation value Sat of the chrominance signals Cb and Cr. The saturation controller 60 may precisely control and output the saturation of the chrominance signals Cb and Cr for each saturation control area by summing a value obtained by applying (multiplying) the first saturation gain of the first saturation control area 52L to (and) the first saturation value SCP_LM of the first saturation control area 52L and a value obtained by applying (multiplying) the second saturation gain of the second saturation control area 52M to (and) the second saturation value (Sat-SCP_LM) of the second saturation control area 52M.

When the saturation value of the supplied chrominance signals Cb and Cr is greater than or equal to the second saturation control point SCP_MH, the saturation controller 60 may determine that the supplied chrominance signals Cb and Cr are located in the third saturation control area 52H (see FIG. 5) and may control the saturation of the supplied chrominance signals Cb and Cr for each saturation control area by summing a value obtained by applying (multiplying) the first saturation gain of the first saturation control area 52L to (and) the supplied chrominance signals Cb and Cr, a value obtained by applying (multiplying) the second saturation gain of the second saturation control area 52M to (and) the supplied chrominance signals Cb and Cr, and a value obtained by applying (multiplying) the third saturation gain of the third saturation control area 52H to (and) the supplied chrominance signals Cb and Cr.

The saturation controller 60 may divide the saturation value Sat of the chrominance signals Cb and Cr located in the third saturation control area 52H into the first saturation value SCP_LM of the first saturation control area 52L, the second saturation value (SCP_MH-SCP_LM) of the second saturation control area 52M obtained by subtracting the first saturation control point SCP_LM from the second saturation control point SCP_MH, and the third saturation value ((Sat-SCP_MH) or SCP_MH) of the third saturation control area 52H. The saturation controller 60 may precisely control and output the saturation of the chrominance signals Cb and Cr for each saturation control area by summing all of the value obtained by applying (multiplying) the first saturation gain of the first saturation control area 52L to (and) the first saturation value SCP_LM of the first saturation control area 52L, the value obtained by applying (multiplying) the second saturation gain of the second saturation control area 52M to (and) the second saturation value (SCP_MH-SCP_LM) of the second saturation control area 52M, and the value obtained by applying (multiplying) the third saturation gain of the third saturation control area 52H to (and) the third saturation value ((Sat-SCP_MH) or SCP_MH) of the third saturation control area 52H.

The saturation controller 60 may output the Y signal and the first and second hue gains, which are supplied from the parameter calculator 50, the Cb and Cr signals whose saturation is adjusted by the saturation controller 60, and the saturation value, which is calculated by the saturation controller 60, to the hue controller 70.

The hue controller 70 may control the hue of the Cb and Cr signals supplied from the saturation controller 60 using any one of the first and second hue gains according to the saturation value supplied from the saturation controller 60.

The hue controller 70 may determine the hue control area by comparing the saturation value supplied from the saturation controller 60 with the hue control point HCP and may control the hue of the Cb and Cr signals supplied from the saturation controller 60 by applying the hue gain of the determined hue control area to the Cb and Cr signals supplied from the saturation controller 60.

For example, when the saturation value supplied from the saturation controller 60 is less than or equal to the hue control point HCP, the hue controller 70 may determine that the chrominance signals Cb and Cr are located in the first hue control area 54L (see FIG. 5), may select a first hue gain of the first hue control area 54L supplied from the saturation controller 60, and adjust the hue of the Cb and Cr signals by applying the selected first hue gain to the Cb and Cr signals supplied from the saturation controller 60.

When the saturation value supplied from the saturation controller 60 is greater than the hue control point HCP, the hue controller 70 may determine that the chrominance signals Cb and Cr are located in the second hue control area 54H (see FIG. 5), may select a second hue gain of the second hue control area 54H supplied from the saturation controller 60, and adjust the hue of the Cb and Cr signals by applying the selected second hue gain to the Cb and Cr signals supplied from the saturation controller 60.

Figure 7:
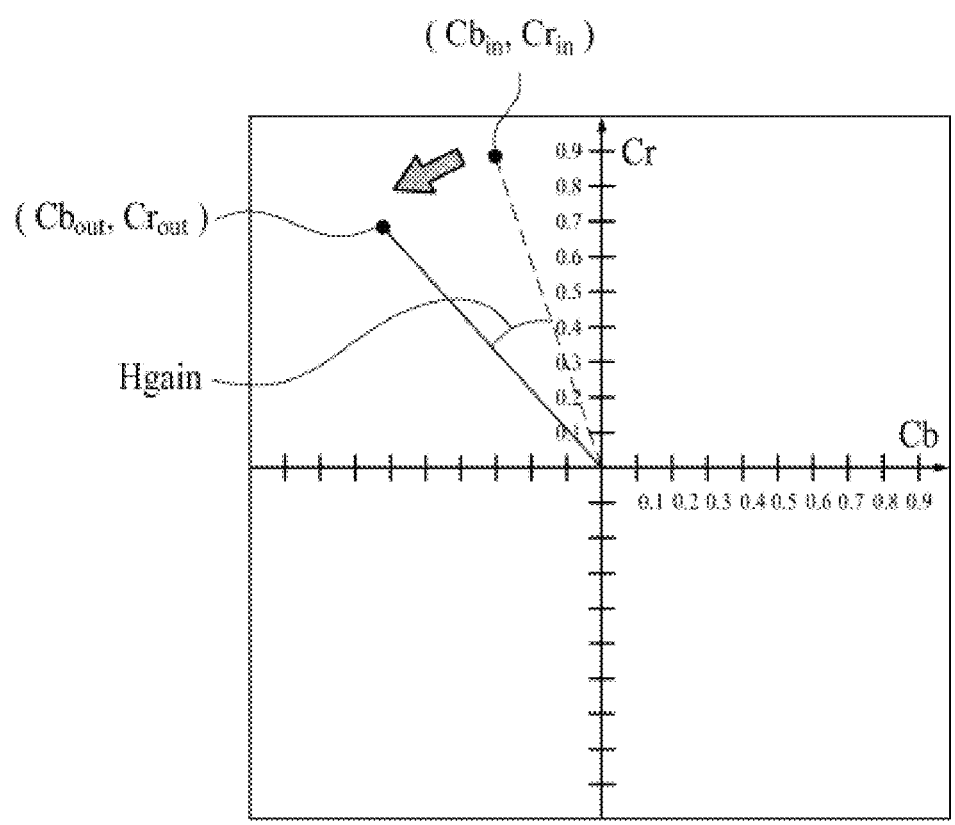
FIG. 7 is a diagram illustrating a method of controlling a hue according to an embodiment.

Referring to FIG. 7, the hue controller 70 may rotate supplied Cb and Cr signals $Cb_{in}$ and $Cr_{in}$ by a hue control gain $H_{gain}$ by applying the hue control gain $H_{gain}$ selected according to the supplied saturation value and may output Cb and Cr signals $Cb_{out}$ and $Cr_{out}$ whose hue is controlled. The hue controller 70 may apply the hue control gain $H_{gain}$ selected according to the supplied saturation value to the Cb and Cr signals $Cb_{in}$ and $Cr_{in}$ supplied from the saturation controller 60 as shown in Equation 5 below, and may output the Cb and Cr signals $Cb_{out}$ and $Cr_{out}$ whose hue is controlled.

$$Cb_{out} = Cb_{in} \times \cos(H_{gain}) + Cr_{in} \times \sin(H_{gain})$$

$$Cr_{out} = -Cb_{in} \times \sin(H_{gain}) + Cr_{in} \times \cos(H_{gain}) \quad \text{[Equation 5]}$$

The hue controller 70 may output the Y signal supplied from the saturation controller 60 and the Cb and Cr signals whose saturation and hue are adjusted in the corresponding control area by the saturation controller 60 and the hue controller 70 to the overall controller 80. Meanwhile, when the overall controller 80 is omitted, the hue controller 70 may output the Y signal and the Cb and Cr signals whose saturation and hue are adjusted to the color space inverse converter 90.

The overall controller 80 may additionally control the saturation and hue of the image signals Y, Cb, and Cr supplied from the hue controller 70 without dividing the control area.

To this end, overall parameters for entirely controlling all of the control areas, that is, overall saturation gains for entirely controlling the saturation of all of the control areas and overall hue gains for entirely controlling the hue of all of the control areas, may be preset and stored in the register.

The overall controller 80 may entirely control the saturation once more by applying (multiplying) the overall saturation gains to (and) the Cb and Cr signals supplied from the hue controller 70. The overall controller 80 may entirely control the hue once more by applying the overall hue gains to the Cb and Cr signals whose saturation is controlled by applying the overall saturation gains, as shown in Equation 5 above.

The overall controller 80 may output the Y signal supplied from the hue controller 70 and the Cb and Cr signals whose saturation and hue are entirely and further adjusted by the overall controller 80 to the color space inverse converter 90.

The color space inverse converter 90 may inversely convert the Y, Cb, and Cr signals supplied from the overall controller 80 or the hue controller 70 into R', G', and B' signals and may output the converted R', G' and B' signals.

For example, the color space inverse converter 90 may inversely convert the Y, Cb, and Cr signals into R', G', and B' signals by using a YCbCr-to-RGB conversion function in which transform coefficients (in BT.2020) are applied as shown in Equation 6 below. The transform coefficients applied to Equation 6 below may be changed.

$$R' = Y + 1.4746 \times Cr$$

$$G' = Y - 0.1645 \times Cb - 0.5714 \times Cr$$

$$B' = Y + 1.8814 \times Cb \quad \text{[Equation 6]}$$

As described above, in the color gamut mapping method and the color gamut mapping device 600 according to the embodiment, the saturation and hue of the input image may be controlled for each control area divided according to the hue axis and the saturation value, and thus the input image may be corrected to match the target color gamut of the corresponding display device and the corrected input image may be output.

In particular, in the color gamut mapping method and the color gamut mapping device 600 according to the embodiment, the saturation of the input image may be controlled by changing the saturation gain (parameter) of the uppermost saturation control area 52H assigned to each hue axis, and thus the gamma characteristic (curve) for each color of the input image may be tuned to match the target gamma curve for each color of the corresponding display device.

Figure 8:
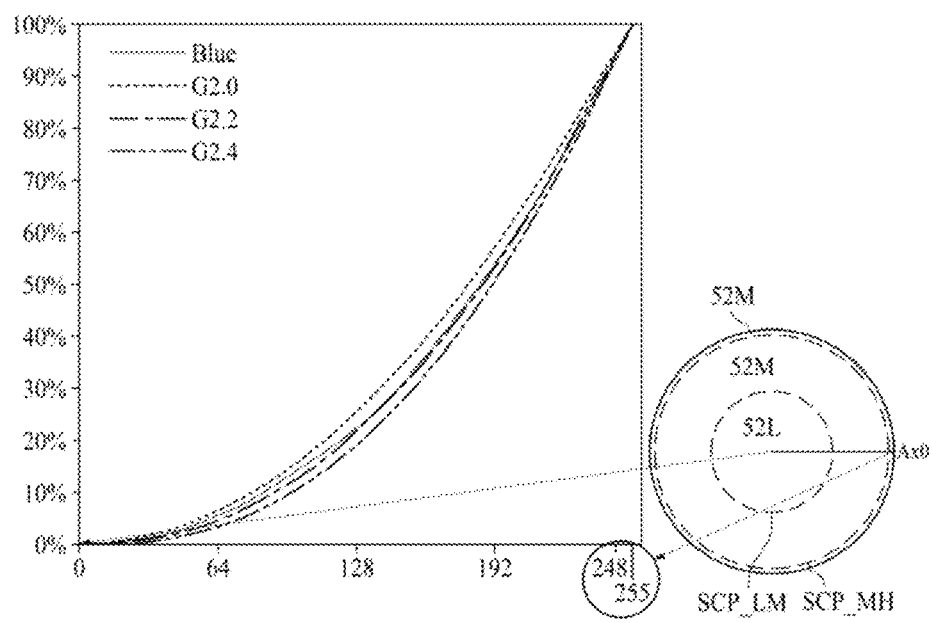
FIG. 8 is a graph showing a relationship between a gamma curve and a saturation value according to an embodiment.

FIG. 8 is a diagram showing a relationship between a saturation value and a gamma curve controlled by a color gamut mapping device according to an embodiment.

Specifically, FIG. 8 shows gamma curves G2.0, G2.2, and G2.4 having gamma values of 2.0, 2.2, and 2.4, respectively, and shows a blue (B) 2.2 gamma curve showing that the gamma curve is related to a blue saturation value. In a gamma curve graph shown in FIG. 8, an X-axis represents an input grayscale value and a Y-axis represents a normalized brightness (Y %) as shown in Equation 7 below.

$$Y\% = \frac{Measure_{nit} - Min_{nit}}{Max_{nit} - Min_{nit}} \times 100 \quad \text{[Equation 7]}$$

In Equation 7 above, $Max_{nit}$ denotes a maximum brightness (nit) of each pixel, $Min_{nit}$ denotes a minimum brightness (nit) of each pixel, and $Measure_{nit}$ denotes a brightness (nit) measured from a pixel of the corresponding display device displaying the input grayscale.

Referring to FIG. 8, it can be seen that, in a circular color area on the Cb-Cr plane, each of R, G, and B monochromatic saturation values is proportional to the grayscale value of the X-axis of the corresponding monochromatic gamma curve and that as the monochromatic saturation value increases, the grayscale value increases and thus the output brightness increases.

In the color gamut mapping device, by changing the saturation gain (parameter) of the uppermost saturation control area 52H determined by the second saturation control point SCP_MH among the plurality of saturation control areas 52L, 52M, and 52H divided according to the saturation value in the circular color area on the Cb-Cr plane, the gamma curve may vary.

In the color gamut mapping device, the second saturation control point SCP_MH may be set to a value 248 close to a maximum saturation value 255 or may be set to a maximum saturation value 255.

In the color gamut mapping device, when the uppermost saturation value of the uppermost saturation control area 52H is controlled by adjusting the saturation parameter, that is, the saturation gain, of the uppermost saturation control area 52H assigned to each hue axis, a brightness of a corresponding pixel may be changed through a change of an uppermost grayscale value of R, G, and B data so that the brightness of the pixel whose saturation is controlled through the saturation control areas 52L and 52M at a lower level than the uppermost saturation control area 52H may also be relatively changed, and thus the gamma curve may vary.

For example, when the saturation gain of the uppermost saturation control area 52H assigned to each hue axis is relatively increased, the brightness of the pixel whose saturation is controlled through the saturation gain of the uppermost saturation control area 52H may be increased so that the brightness of the pixel whose saturation is controlled through the saturation control areas 52L and 52M at a lower level than the uppermost saturation control area 52H may also be relatively reduced, and thus the gamma value of the gamma curve may be relatively increased (G2.2→G2.4).

On the other hand, when the saturation gain of the uppermost saturation control area 52H assigned to each hue axis is relatively reduced, the brightness of the pixel whose saturation is controlled through the saturation gain of the uppermost saturation control area 52H may be reduced so that the brightness of the pixel whose saturation is controlled through the saturation control areas 52L and 52M at a lower level than the uppermost saturation control area 52H may also be relatively increased, and thus the gamma value of the gamma curve may be relatively reduced (G2.2→G2.0).

Figure 9:
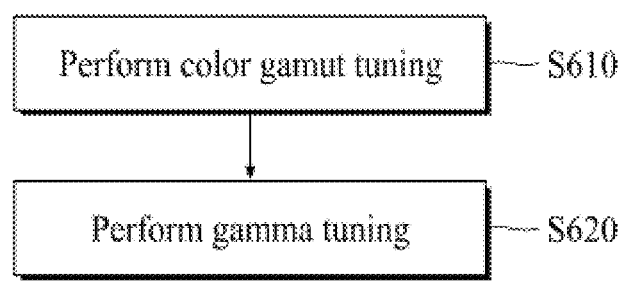
FIG. 9 is a diagram illustrating a tuning method of a color gamut mapping device according to an embodiment.

FIG. 9 is a diagram illustrating a tuning method of a color gamut mapping device 600 according to an embodiment.

Referring to FIG. 9, the tuning method of the color gamut mapping device 600 illustrated in FIG. 1 may include a color gamut tuning operation S610 and a gamma tuning operation S620, and the operations of the tuning method of the color gamut mapping device 600 may be sequentially performed by a test device connected to the color gamut mapping device 600.

First, the test device may set a plurality of parameters including a first saturation control point SCP_LM, a second saturation control point SCP_MH, a hue control point HCP, saturation gains of a plurality of saturation control areas 52L, 52M, and 52H assigned to hue axes, and hue gains of a plurality of hue control areas 54L and 54H assigned to the hue axes, and the test device may store the plurality of parameters in a register of the color gamut mapping device 600. In this case, the second saturation control point SCP_MH that determines an uppermost saturation control area 52H may be set to a value 248 close to a maximum saturation value 255 or may be set to a maximum saturation value 255.

In the color gamut tuning operation S610, the test device may determine parameters suitable for a target color gamut of a corresponding display device and store the parameters in the register of the color gamut mapping device 600, by repeating a color gamut tuning process, in which a hue and saturation of an input image are controlled by adjusting parameters (saturation parameters and hue parameters) stored in the register of the color gamut mapping device 600, a color gamut of an output image displayed on the display device is measured through the color gamut mapping device 600, and a measured color gamut is compared with the target color and determined. In this case, the test device may tune the color gamut by adjusting the remaining parameters except for the saturation gain of the uppermost saturation control area 52H.

After the color gamut tuning operation S610 is completed, in the gamma tuning operation S620, the test device may measure a gamma curve for each of the R, G, and B by measuring a brightness of the output image displayed on the display device for each color while increasing a grayscale of the image for each of the R, G, and B supplied to the color gamut mapping device 600. The test device may determine whether the measured gamma curve falls within a range of the target gamma curve by comparing the measured gamma curve for each color with the target gamma curve for each color of the corresponding display device. When it is determined that the measured gamma curve for each color does not fall within the range of the target gamma curve for each color, the test device may adjust the gamma curve for each of the R, G, and B by repeating a gamma tuning process, in which the uppermost saturation control area 52H of each hue axis of the color gamut mapping device 600 or the saturation gain assigned to the maximum saturation value 255 is adjusted, the gamma curve is re-measured for each of the R, G, and B, and a measurement result is determined.

For example, when the saturation gain of the uppermost saturation control area 52H of each hue axis is increased, the brightness of the pixel whose saturation is controlled through the saturation gain of the uppermost saturation control area 52H may be increased so that the brightness of the pixel whose saturation is controlled through the saturation control areas 52L and 52M at a lower level than the uppermost saturation control area 52H may also be relatively reduced, and thus the gamma value of the gamma curve may be increased.

On the other hand, when the saturation gain of the uppermost saturation control area 52H of each hue axis is reduced, the brightness of the pixel whose saturation is controlled through the saturation gain of the uppermost saturation control area 52H may be reduced so that the brightness of the pixel whose saturation is controlled through the saturation control areas 52L and 52M at a lower level than the uppermost saturation control area 52H may also be relatively increased, and thus the gamma value of the gamma curve may be reduced.

When it is determined that the measured gamma curve for each color falls within the range of the target gamma curve for each color, the test device stores the adjusted uppermost saturation control area 52H of each hue axis or the adjusted saturation gain of the maximum saturation value 255 in the corresponding register and the gamma tuning is completed.

As described above, in the tuning method of the color gamut mapping device according to the embodiment, after the color gamut tuning is completed, the uppermost saturation control area 52H assigned to each hue axis or the saturation gain of the maximum saturation value may be adjusted, and thus the gamma curve may be tuned for each of the R, G, and B.

Figure 10A:
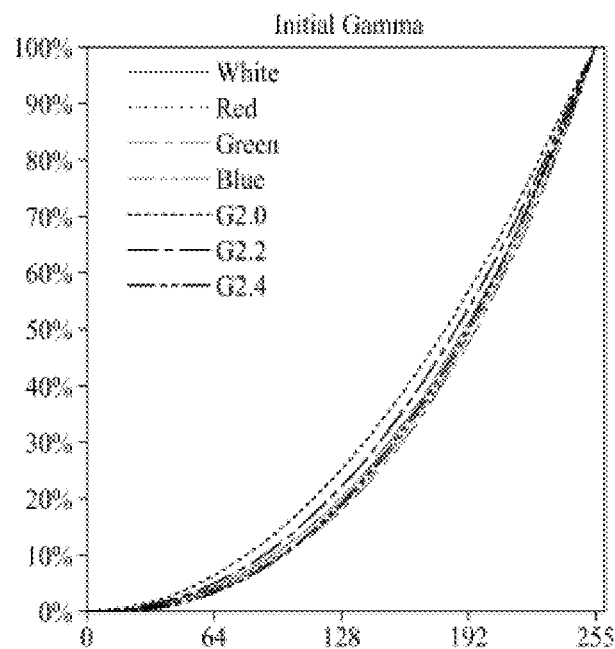
FIGS. 10A and 10B are graphs showing initial gamma curves and tuned gamma curves for comparison using a color gamut mapping device according to an embodiment.
Figure 10B:
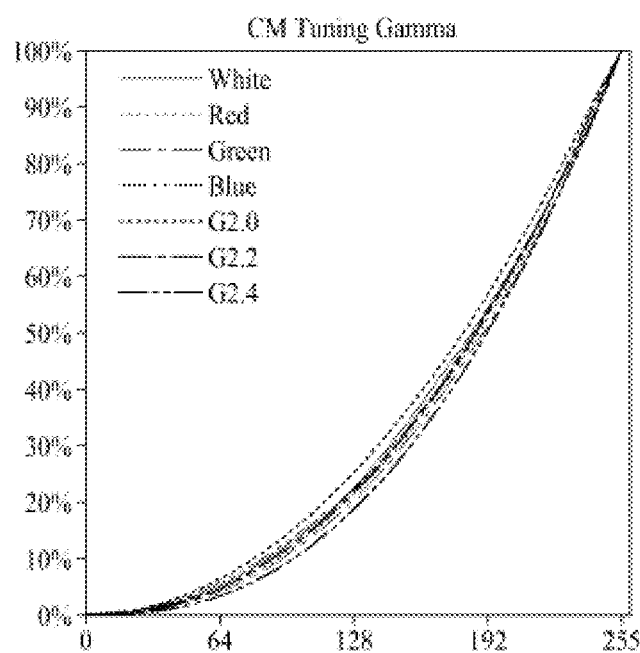

FIGS. 10A and 10B are graphs showing initial gamma curves before tuning and tuned gamma curves for comparison using a color gamut mapping device according to an embodiment.

Referring to FIG. 10A, it can be seen that a gamma curve for each of the R, G, and B measured before gamma curves are tuned using the color gamut mapping device according to the embodiment is similar to a 2.4 gamma curve (G2.4), but is different from a 2.2 gamma curve (G2.2), which is a target gamma curve of the display device.

Referring to FIG. 10B, it can be seen that the gamma curve for each of the R, G, and B measured after the gamma curves are tuned by adjusting the saturation gain of the uppermost saturation control area using the color gamut mapping device according to the embodiment is tuned similar to a 2.2 gamma curve (G2.2), which is a target gamma curve of the display device.

Figure 11:
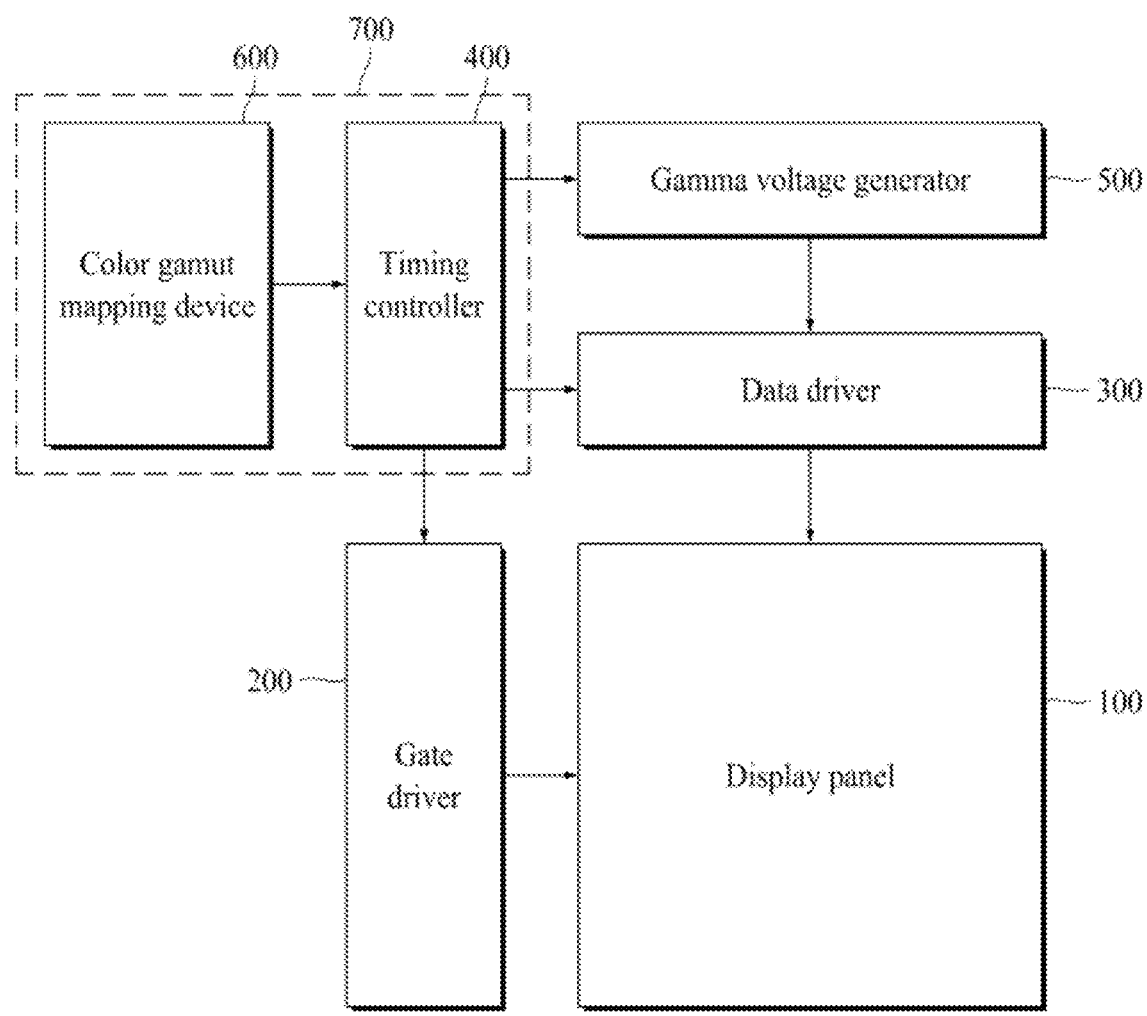
FIG. 11 is a block diagram illustrating a display device having a color gamut mapping device capable of performing gamma tuning according to an embodiment.

FIG. 11 is a block diagram schematically illustrating a configuration of a display device to which the color gamut mapping device 600 according to the embodiment is applied.

The display device according to the embodiment may be any one of various display devices including a liquid crystal display device, an electroluminescent display device, a micro light-emitting diode (LED) display device, and the like. The electroluminescent display device may be an organic LED (OLED) display device, a quantum dot LED display device, or an inorganic LED display device.

Referring to FIG. 11, the display device may include a display panel 100, a gate driver 200, a data driver 300, a gamma voltage generator 500, a timing controller 400, a color gamut mapping device 600, and the like. The color gamut mapping device 600 and the timing controller 400 may be defined as an image processor 700. The gate driver 200 and the data driver 300 may be defined as a panel driving part. The gate driver 200, the data driver 300, and the timing controller 400 may be defined as a display driving part. The color gamut mapping device 600 may be implemented by being embedded in the timing controller 400.

As described above, the color gamut mapping device 600 may map the output image to match the target color gamut of the display device by controlling the hue and saturation of the input image for each control area and may output the output image mapped to the target color gamut to the timing controller 400. In particular, the color gamut mapping device 600 may output the output image, which is corrected to match the target gamma curve for each color of the display device by changing the saturation gain of the uppermost saturation control area 52H assigned to each hue axis, to the timing controller 400.

The timing controller 400 may perform various types of post-processing on image data supplied from the color gamut mapping device 600, such as luminance correction or image quality correction for reducing power consumption, and may supply the post-processed image data to the data driver 300.

The timing controller 400 may receive synchronization signals together with the image data through the color gamut mapping device 600. The synchronization signals may include a dot clock, a data enable signal, a vertical synchronization signal, a horizontal synchronization signal, and the like. The timing controller 400 may generate and supply a plurality of data control signals using the supplied synchronization signals and timing setup information (start timing, a pulse width, etc.) stored therein to the data driver 300 and may generate and supply a plurality of gate control signals to the gate driver 200.

The gamma voltage generator 500 may generate and supply a reference gamma voltage set including a plurality of reference gamma voltages having different voltage levels to the data driver 300. The gamma voltage generator 500 may generate and supply a plurality of reference gamma voltages corresponding to the gamma characteristics of the display device to the data driver 300 under the control of the timing controller 400. The gamma voltage generator 500 may be configured as a programmable gamma integrated chip (IC), and the gamma voltage generator 500 may receive gamma data from the timing controller 400, generate or adjust a reference gamma voltage level according to the gamma data, and output the reference gamma voltage level to the data driver 300.

The data driver 300 is controlled according to the data control signal supplied from the timing controller 400, and the data driver 300 converts digital image data supplied from the timing controller 400 into analog data signals and supplies a corresponding data signal to each of the data lines of the display panel 100. The data driver 300 may convert the digital image data into the analog data signal using grayscale voltages in which the plurality of reference gamma voltages supplied from the gamma voltage generator 500 are subdivided.

The gate driver 200 may be controlled according to the plurality of gate control signals supplied from the timing controller 400 and may individually drive the gate lines of the display panel 100. The gate driver 200 may sequentially drive the plurality of gate lines. The gate driver 200 may supply a scan signal of a gate-on voltage to a corresponding gate line during a driving period of each gate line and may supply a gate-off voltage to the corresponding gate line during a non-driving period of each gate line.

The display panel 100 displays an image through a display area in which subpixels are arranged in a matrix form. Each subpixel is any one of an R subpixel emitting R light, a G subpixel emitting G light, a B subpixel emitting B light, and a white (W) subpixel emitting W light and is independently driven by at least one thin-film transistor (TFT). A unit pixel may be formed as a combination of two, three, or four subpixels having different colors.

The display panel 100 may further include a touch sensor screen that senses a user's touch by entirely overlapping a display area, and the touch sensor screen may be embedded in the display panel 100 or disposed on the display area of the display panel 100.

As described above, in the color gamut mapping device, the tuning method thereof, and the image processor according to the embodiment, the color gamut can be tuned to match the target color gamut of the corresponding display device by controlling the saturation and hue of the image for each control area divided according to the hue axis and the saturation value and the gamma characteristic for each color can be tuned to match the target gamma curve for each color of the corresponding display device by adjusting the saturation gain of the uppermost saturation control area assigned to each hue axis, and as a result, color reproducibility can be improved and thus quantitative and qualitative image quality evaluation can be improved.

The color gamut mapping device and the display device including the same according to the embodiment may be applied to various electronic devices. For example, the color gamut mapping device and the display device including the same according to the embodiment may be applied to a mobile device, a video phone, a smart watch, a watch phone, a wearable device, a foldable device, a rollable device, a bendable device, a flexible device, a curved device, an electronic notebook, an e-book, a portable multimedia player (PMP), a personal digital assistant (PDA), an MPEG audio layer-3 player, a mobile medical device, a desktop personal computer (PC), a laptop PC, a netbook computer, a workstation, a navigation device, a vehicle navigation device, a vehicle display device, a television, a wallpaper display device, a signage device, a game device, a notebook computer, a monitor, a camera, a camcorder, a home appliance, and the like.

The color gamut mapping device according to the embodiment may be implemented in the form of an IC. A function of the color gamut mapping device according to the embodiment may be implemented in the form of a program and mounted in an IC. The function of the color gamut mapping device according to the embodiment may be implemented as a program, functions of the components included in the color gamut mapping device may be implemented as a specific code, and code for implementing a specific function may be implemented as one program or may be implemented by being divided into a plurality of programs.

Features, structures, effects, etc. described above in various examples of the present disclosure are included in at least one example of the present disclosure and are not necessarily limited to only one example. Furthermore, features, structures, effects, etc. illustrated in at least one example of the present disclosure may be combined or modified for other examples by those skilled in the art to which the technical idea of the present disclosure pertains.

Therefore, the contents related to such combinations and modifications should be interpreted as being included in the technical spirit or scope of the present disclosure.

While the present disclosure described above is not limited to the above-described embodiments and the accompanying drawings, it will be apparent to those skilled in the art to which the present disclosure belongs that various substitutions, modifications, and changes may be made herein without departing from the scope of the present disclosure. Therefore, the scope of the present disclosure is defined by the appended claims, and all changes or modifications derived from the meaning, scope, and equivalence of the claims are to be construed as being included in the scope of the present disclosure.

What is claimed is:

1. A tuning method of a color gamut mapping device, the tuning method comprising:
    in each of a plurality of control areas divided by a plurality of hue axes having different hue angles, setting, by a test device, an uppermost saturation control point, which determines an uppermost saturation control area, among a plurality of saturation control points of the color gamut mapping device divided into a plurality of saturation control areas according to a saturation value to a maximum saturation value or setting the uppermost saturation control point to a saturation value close to the maximum saturation value;
    changing, by the test device, hue parameters of the color gamut mapping device assigned to each of the plurality of hue axes and saturation parameters of the color gamut mapping device assigned to correspond to each of the plurality of saturation control areas of each hue axis and tuning a color gamut of the color gamut mapping device to match a target color gamut; and
    measuring, by the test device, a gamma curve for each color by measuring a brightness for each grayscale value of each color image displayed on a display device using the tuned color gamut of the color gamut mapping device, and tuning a gamma curve for each color to match a target gamma curve for each color by changing the saturation parameter of the color gamut mapping device corresponding to the uppermost saturation control area according to a result of comparing the measured gamma curve for each color with the target gamma curve for each color.

2. The tuning method of claim 1, wherein, when the saturation parameter corresponding to the uppermost saturation control area is increased, a brightness of a pixel whose saturation is controlled through the uppermost saturation control area is increased, a brightness of a pixel whose saturation is controlled through the remaining saturation control areas is relatively reduced, and thus a gamma value of the gamma curve for each color is increased.

3. The tuning method of claim 1, wherein, when the saturation parameter corresponding to the uppermost saturation control area is reduced, a brightness of a pixel whose saturation is controlled through the uppermost saturation control area is reduced, a brightness of a pixel whose saturation is controlled through the remaining saturation control areas is relatively increased, and thus a gamma value of the gamma curve for each color is reduced.

4. The tuning method of claim 1, wherein the tuning of the color gamut includes changing, by the test device, the saturation parameters of the remaining saturation control areas except for the uppermost saturation control area among the saturation parameters of the color gamut mapping device.

5. The tuning method of claim 1, wherein the tuning of the gamma curve includes, as the result of the comparison, until the measured gamma curve for each color falls within a range of the target gamma curve for each color, repeating, by the test device, an operation, in which the saturation parameter of the uppermost saturation control area of the color gamut mapping device is changed, the gamma curve of each color image output to the display device through the color gamut mapping device is measured, and the measured gamma curve for each color is compared with the target gamma curve for each color.

6. A color gamut mapping device, wherein the color gamut mapping device is configured to:
    in each of a plurality of control areas divided by a plurality of hue axes having different hue angles, set an uppermost saturation control point, which determines an uppermost saturation control area, among a plurality of saturation control points divided into a plurality of saturation control areas according to a saturation value to a maximum saturation value or set the uppermost saturation control point to a saturation value close to the maximum saturation value;
    control a hue and saturation of an image signal to match a target color gamut using a hue parameter assigned to each of the plurality of hue axes and a saturation parameter assigned to correspond to each of the plurality of saturation control areas of each hue axis; and
    change the saturation of the image signal by changing the saturation parameter which is assigned to each hue axis and corresponds to the uppermost saturation control area so that a gamma characteristic for each color of the image signal is changed to match a target gamma curve for each color.

7. The color gamut mapping device of claim 6, wherein, when the saturation parameter corresponding to the uppermost saturation control area is increased, a brightness of a pixel whose saturation is controlled through the uppermost saturation control area is increased, a brightness of a pixel whose saturation is controlled through the remaining saturation control areas is relatively reduced, and thus a gamma value of the gamma characteristic for each color is increased.

8. The color gamut mapping device of claim 6, wherein, when the saturation parameter corresponding to the uppermost saturation control area is reduced, a brightness of a pixel whose saturation is controlled through the uppermost saturation control area is reduced, a brightness of a pixel whose saturation is controlled through the remaining saturation control areas is relatively increased, and thus a gamma value of the gamma characteristic for each color is reduced.

9. The color gamut mapping device of claim 6, comprising:
    a color space converter configured to convert first three-color signals of the image signal into a first luminance component and a pair of first chrominance components and output the first luminance component and the pair of first chrominance components;
    a hue calculator configured to calculate and output a hue angle using the first chrominance components;
    a hue axis selection part configured to select and output hue axes of a corresponding control area in which the calculated hue angle is located among a plurality of control areas;
    a parameter calculator configured to further divide each control area into a plurality of hue control areas by a saturation value of a hue control point, and calculate and output hue gains and saturation gains which are to be applied to the first chrominance components using the saturation parameters assigned to the selected hue axes for each of the plurality of saturation control areas, the hue parameters assigned to each of the plurality of hue control areas, and the calculated hue angle;

a saturation controller configured to control a saturation of the first chrominance component using the calculated saturation gains and output a second chrominance component;

a hue controller configured to control a saturation of the second chrominance component using the calculated hue gains and output a third chrominance component; and a color space inverse converter configured to inversely convert the output chrominance components for which the control of the hue and saturation is completed and the first luminance component into second three-color signals and output the second three-color signals.

10. The color gamut mapping device of claim 9, wherein the parameter calculator is configured to:

calculate a plurality of saturation gains corresponding to the plurality of saturation control areas by interpolating the plurality of saturation parameters that are assigned to the selected hue axes for each of the plurality of saturation control areas using the calculated hue angle; and calculate a plurality of hue gains corresponding to the plurality of hue control areas by interpolating the plurality of hue parameters that are assigned to the selected hue axes for each of the plurality of hue control areas using the calculated hue angle.

11. The color gamut mapping device of claim 10, wherein:

the plurality of saturation control areas include a first saturation control area, a second saturation control area, and a third saturation control area that are divided by a first saturation control point and a second saturation control point and the plurality of hue control areas include a first hue control area and a second hue control area that are divided by the hue control point; and the third saturation control area corresponds to the uppermost saturation control area, and the second saturation control point corresponds to the uppermost saturation control point.

12. The color gamut mapping device of claim 11, wherein:

the saturation controller divides the saturation value of the first chrominance component into first to third saturation values corresponding to the first to third saturation control areas by comparing the saturation value of the first chrominance component with the first and second saturation control points, controls the saturation of the first chrominance component by summing values obtained by applying the first to third saturation gains to the divided first to third saturation values, and outputs the second chrominance component; and the hue controller controls the hue of the second chrominance component by applying any one of the first and second hue gains according to a result of comparing the saturation value of the second chrominance component with the hue control point, and outputs the third chrominance component.

13. The color gamut mapping device of claim 9, further comprising an overall controller configured to entirely control a saturation and hue of the third chrominance component output from the hue calculator using overall saturation gains and overall hue gains and output a fourth chrominance component to the color space inverse converter.

14. An image processor comprising a color gamut mapping device for controlling and outputting a hue and saturation of an image signal to match a target color gamut using hue parameters assigned to each of a plurality of hue axes that determine a plurality of control areas and saturation parameters to correspond to each of a plurality of saturation control areas obtained by dividing each of the plurality of control areas, wherein the color gamut mapping device sets an uppermost saturation control point, which determines an uppermost saturation control area, among a plurality of saturation control points divided into the plurality of saturation control areas as a maximum saturation value or sets the uppermost saturation control point as a saturation value close to the maximum saturation value, the color gamut mapping device changes the saturation of the image signal by changing the saturation parameter which is assigned to each hue axis and corresponds to the uppermost saturation control area so that a gamma characteristic for each color of the image signal is changed to match the target gamma curve for each color.

15. The image processor of claim 14, wherein, when the saturation parameter corresponding to the uppermost saturation control area is increased, a brightness of a pixel whose saturation is controlled through the uppermost saturation control area is increased, a brightness of a pixel whose saturation is controlled through the remaining saturation control areas is relatively reduced, and thus a gamma value of the gamma characteristic for each color is increased.

16. The image processor of claim 14, wherein, when the saturation parameter corresponding to the uppermost saturation control area is reduced, a brightness of a pixel whose saturation is controlled through the uppermost saturation control area is reduced, a brightness of a pixel whose saturation is controlled through the remaining saturation control areas is relatively increased, and thus a gamma value of the gamma characteristic for each color is reduced.

17. The image processor of claim 14, wherein the color gamut mapping device includes:

a color space converter configured to convert first three-color signals of the image signal into a first luminance component and a pair of first chrominance components and output the first luminance component and the pair of first chrominance components;

a hue calculator configured to calculate and output a hue angle using the first chrominance components;

a hue axis selection part configured to select and output hue axes of a corresponding control area in which the calculated hue angle is located among the plurality of control areas;

a parameter calculator configured to further divide each control area into a plurality of hue control areas by a saturation value of a hue control point, and calculate and output hue gains and saturation gains which are to be applied to the first chrominance components using the saturation parameters assigned to the selected hue axes for each of the plurality of saturation control areas, the hue parameters assigned to each of the plurality of hue control areas, and the calculated hue angle;

a saturation controller configured to control a saturation of the first chrominance component using the calculated saturation gains and output a second chrominance component;

a hue controller configured to control a saturation of the second chrominance component using the calculated hue gain and output a third chrominance component; and a color space inverse converter configured to inversely convert the output chrominance components for which the control of the hue and the saturation is completed and the first luminance component into second three-color signals and output the second three-color signals.

18. The image processor of claim 17, wherein the plurality of saturation control areas include a first saturation control area, a second saturation control area, and a third saturation control area that are divided by a first saturation control point and a second saturation control point and the plurality of hue control areas include a first hue control area and a second hue control area that are divided by the hue control point; and the third saturation control area corresponds to the uppermost saturation control area and the second saturation control point corresponds to the uppermost saturation control point.

19. The image processor of claim 18, wherein:

the saturation controller divides the saturation value of the first chrominance component into first to third saturation values corresponding to the first to third saturation control areas by comparing the saturation value of the first chrominance component with the first and second saturation control points, controls the saturation of the first chrominance component by summing values obtained by applying the first to third saturation gains to the divided first to third saturation values, and outputs the second chrominance component; and the hue controller controls the hue of the second chrominance component by applying any one of the first and second hue gains according to a result of comparing the saturation value of the second chrominance component with the hue control point, and outputs the third chrominance component.

20. The image processor of claim 17, wherein the color gamut mapping device further includes an overall controller configured to entirely control a saturation and hue of the third chrominance component output from the hue calculator using overall saturation gains and overall hue gains and output a fourth chrominance component to the color space inverse converter.

\* \* \* \* \*